Aug. 28, 1928. 1,682,311
W. F. SMITH
TRACTOR FOR AGRICULTURAL IMPLEMENTS
Filed Dec. 7, 1921 6 Sheets-Sheet 2
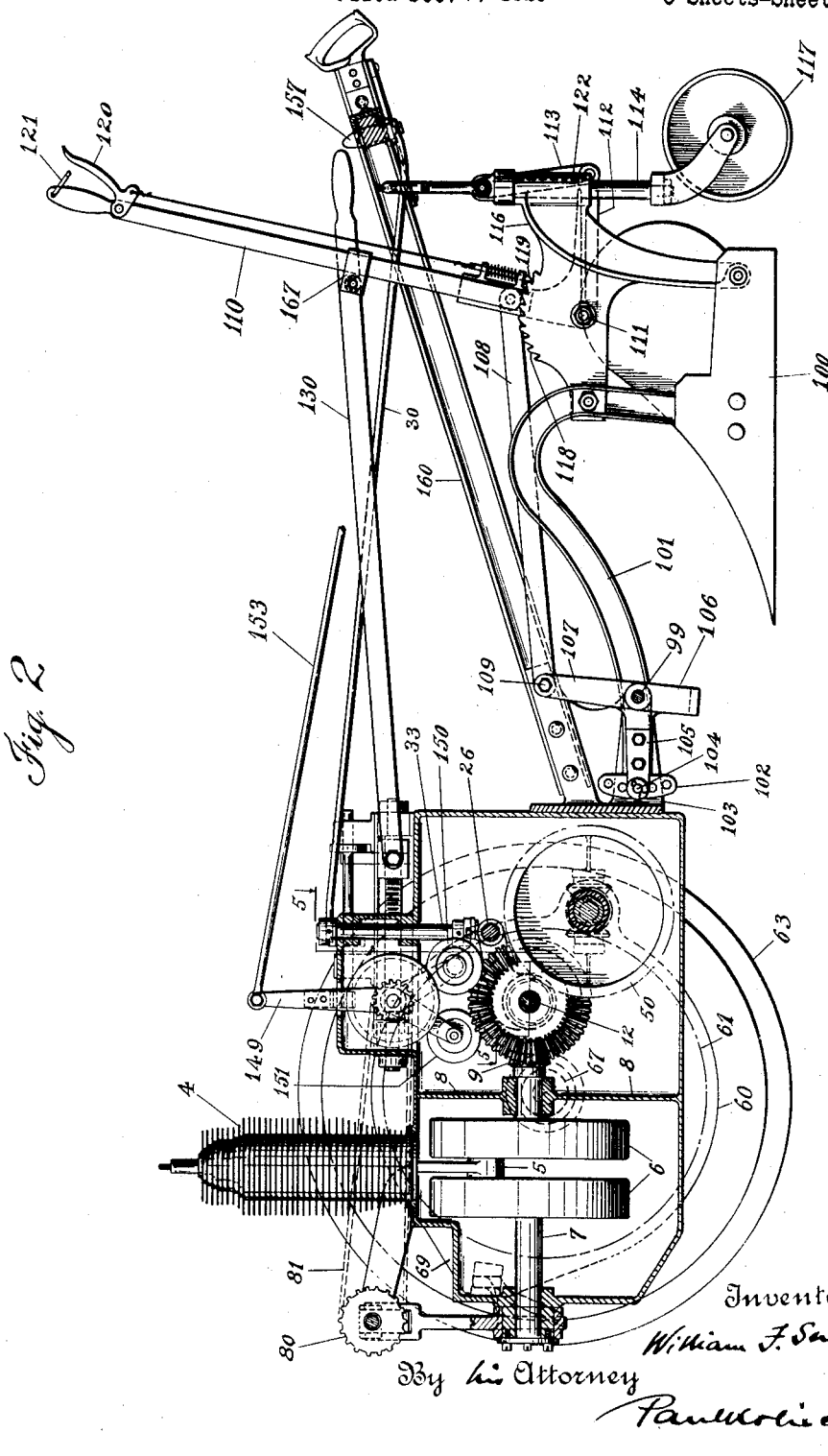
Inventor
William F. Smith
By his Attorney
Paul Kolisch

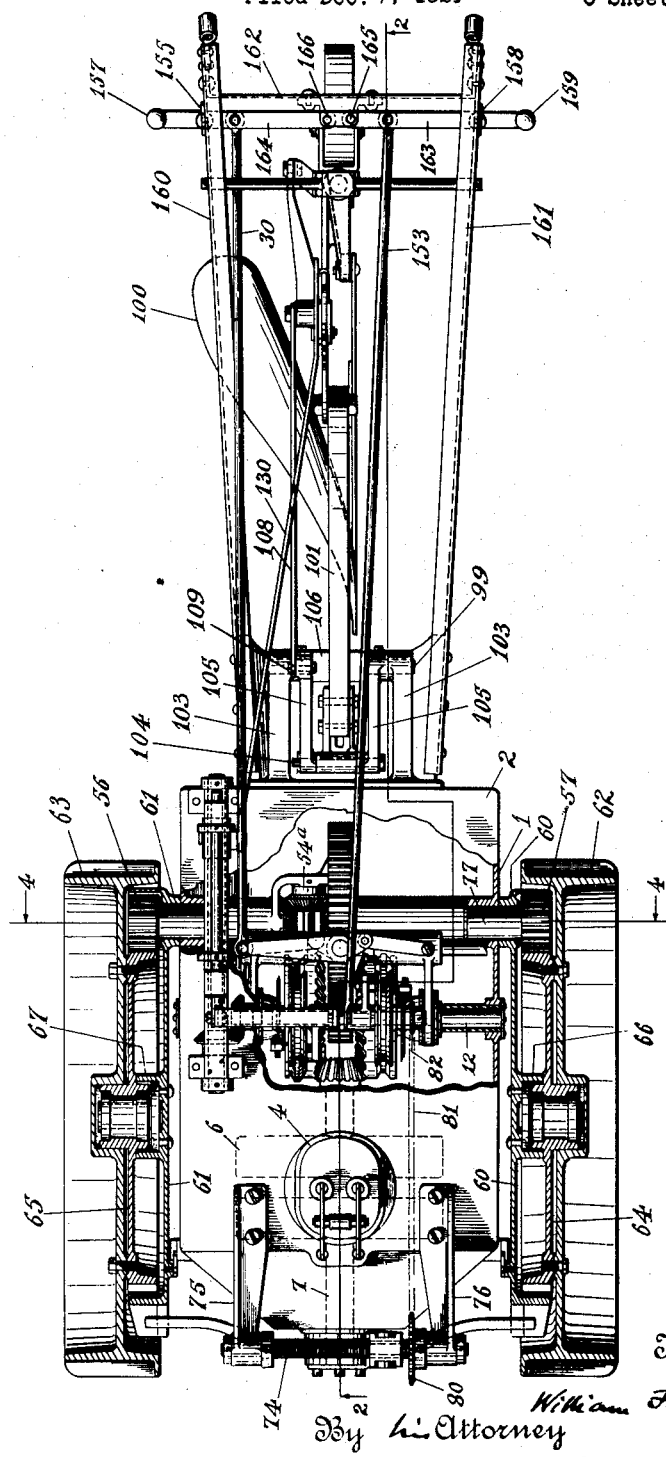

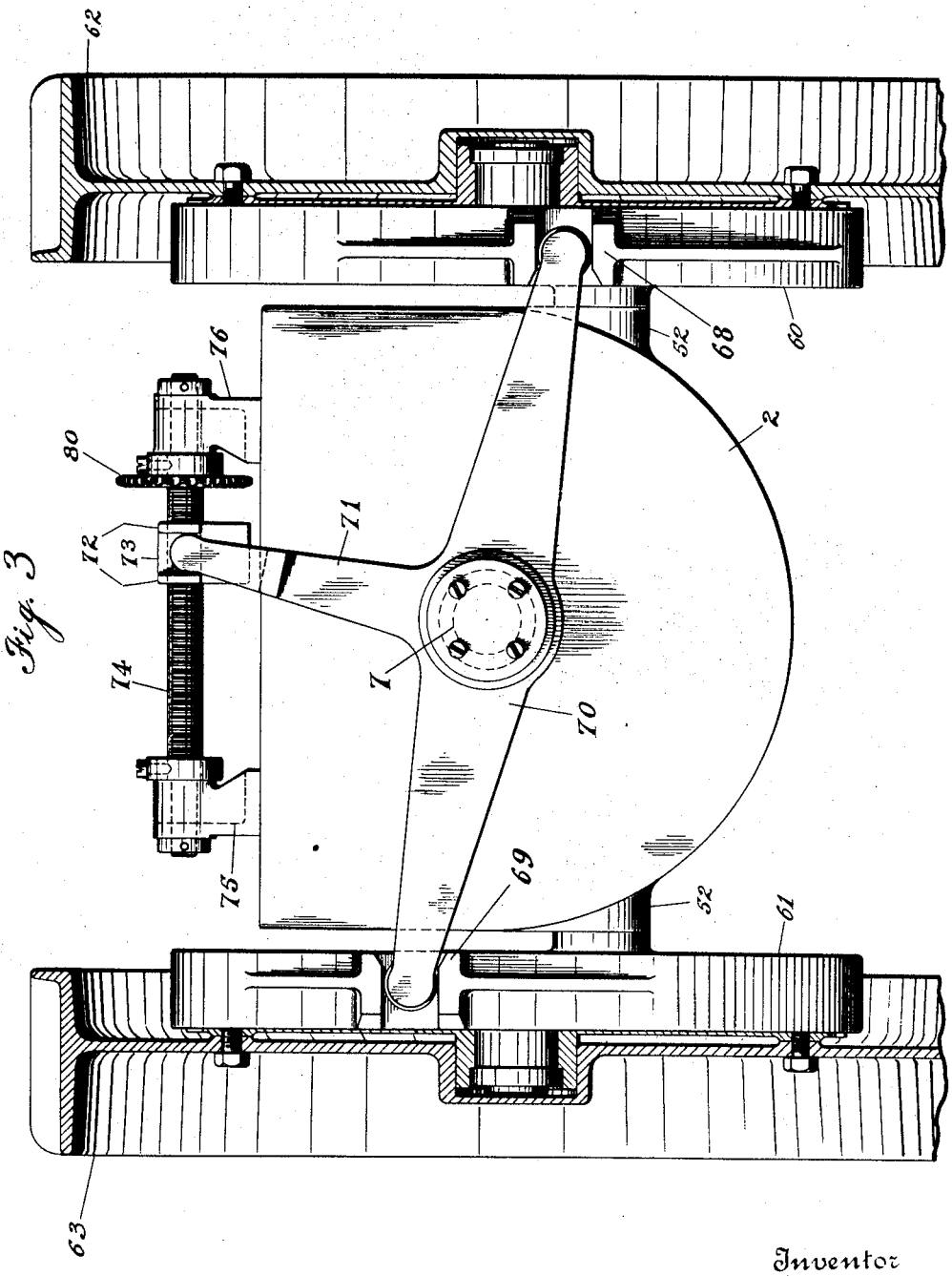

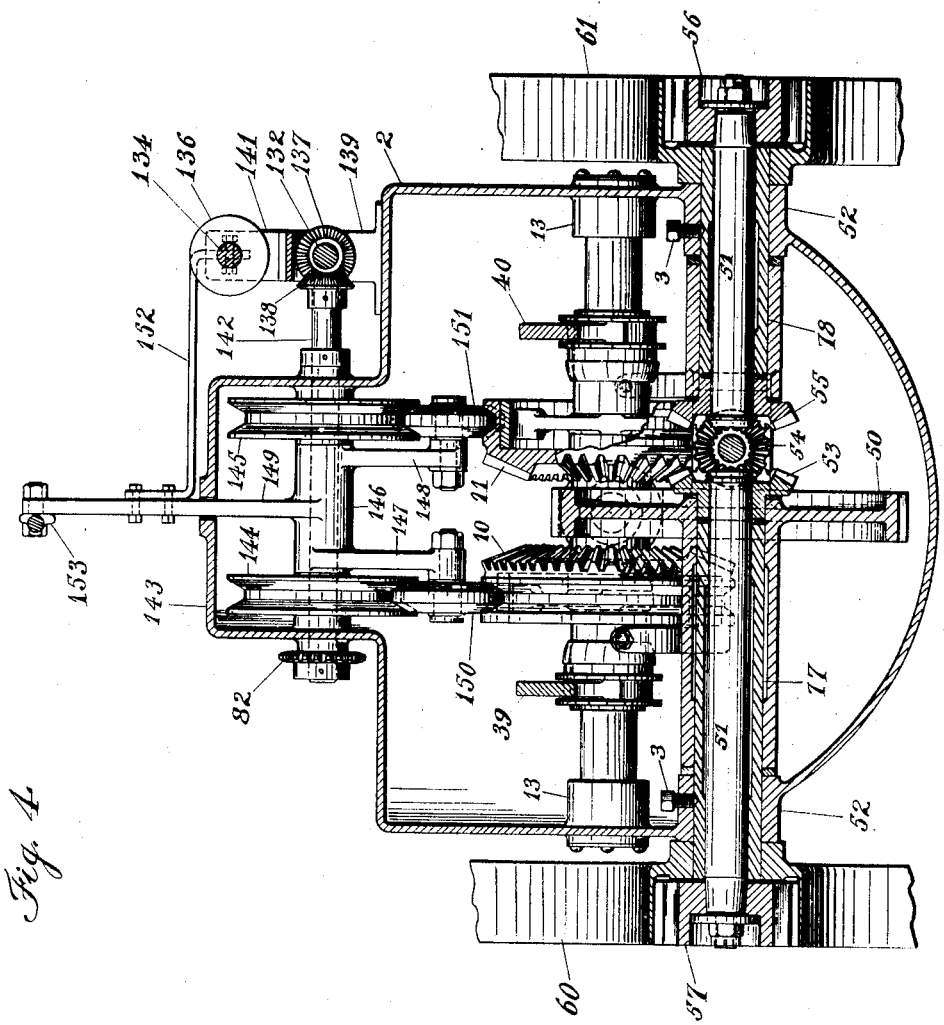

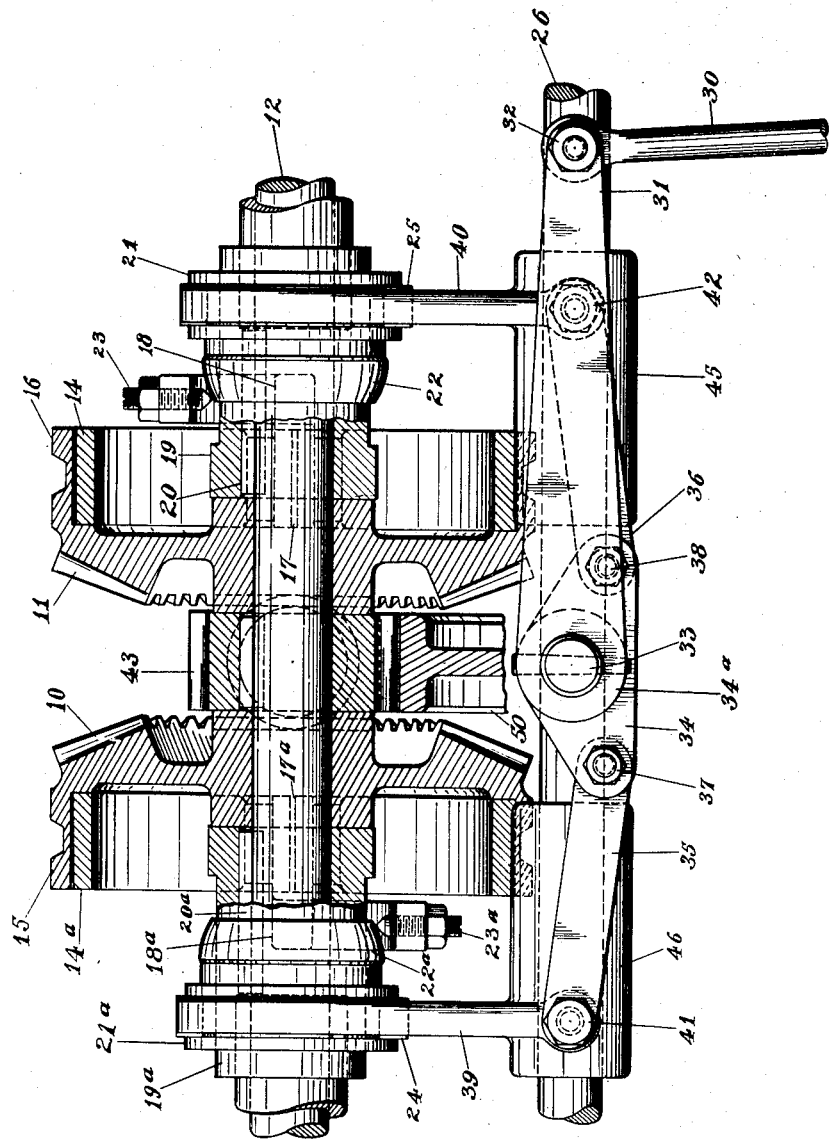

Aug. 28, 1928.  
W. F. SMITH  
1,682,311  
TRACTOR FOR AGRICULTURAL IMPLEMENTS  
Filed Dec. 7, 1921  6 Sheets-Sheet 6
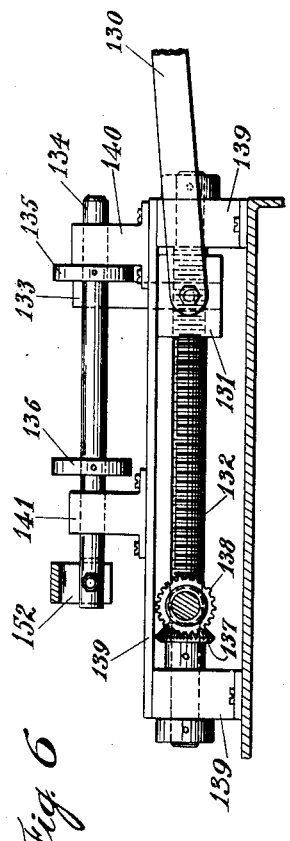
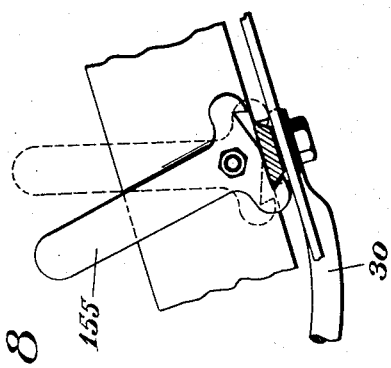
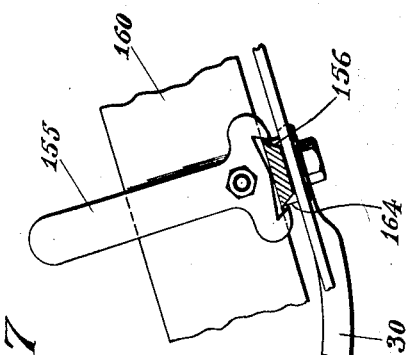
Inventor  
William F. Smith  
By Attorney Patented Aug. 28, 1928.

1,682,311

UNITED STATES PATENT OFFICE.

WILLIAM F. SMITH, OF BROOKLYN, NEW YORK, ASSIGNOR OF ONE-HALF TO HERMAN A. SCHATZ, OF POUGHKEEPSIE, NEW YORK.

TRACTOR FOR AGRICULTURAL IMPLEMENTS.

Application filed December 7, 1921. Serial No. 520,704.

This invention relates to tractors for agricultural implements, and particularly to motor driven devices of this class.

The object of the invention is to provide a properly balanced tractor and implement assembly of simple and strong construction readily adaptable to the various phases and conditions of agriculture.

According to one feature of the invention, a tractor wheel and the implement may be vertically displaced to insure the bevelling of the tractor frame when e. g. during ploughing one of the wheels is in the furrow, and to adapt the implement to varying soil conditions (e. g. deep or shallow ploughing).

The invention provides for means operated by the motor of the tractor simultaneously to control the vertical displacement of the tractor wheel and the implement. In addition, manually operable means are provided for raising or lowering the implement irrespective of the operation of the said motor operated means.

The motor operated wheel and implement lifting and lowering means is under the control of the operator. In order to prevent the raising and lowering of the wheel and implement beyond certain predetermined limits, as soon as such limits are reached and irrespective of the control the operator exercises at that time, automatic means are actuated to prevent the motor controlled mechanism from further lifting or lowering of the wheel and implement. The said automatic means is common to the lifting mechanism of the wheels and the implement.

These and other features will be more clearly understood from the following description and the drawings exemplifying a preferred embodiment of the invention. However, the scope of the present invention is not limited to the particular structures disclosed. Various modifications will obviously appear to those skilled in the art without departing from the spirit of the invention defined in the claims.

Various novel features of the tractor and agricultural implements are disclosed but are not claimed. Claims relative to such features are presented in my co-pending applications, Serial No. 520,703, filed December 7, 1921, and Ser. No. 523,135, filed December 17, 1921.

In the drawings, Fig. 1 is a top plan view of the tractor and plough with part of the casing broken away; Fig. 2 is a sectional side view along lines 2—2 of Fig. 1; Fig. 3 is a front view of the tractor; Fig. 4 is a sectional view, of the transmission and differential taken along lines 4—4 of Fig. 1; Fig. 5 is a sectional view, of the clutch operating mechanism, taken along lines 5—5 of Fig. 2; Fig. 6 is a detail view of the plough lift control; Figs. 7 and 8 are detail views of the combination lock and stop for the plough and wheel lift and clutch control levers.

The operating mechanism of the tractor is supported in a casing consisting of a lower half or sump 1, and an upper half 2. An internal combustion engine 4, preferably of an air-cooled type is provided on top of the casing and operates in the well known manner, a crank-shaft 5 connected with flywheels 6. The flywheels 6 are secured to a shaft 7. One end of the shaft 7 is supported in the front part of the casing in a suitable bearing, and a bearing is provided near the other end of this shaft in a rib or wall 8 provided in the casing halves for that purpose. The rear end of shaft 7 carries thereon a bevelled gear 9 intermeshing with the toothed surfaces of gear wheels 10 and 11 of the transmission, and is adapted to rotate these gear wheels in opposite directions.

The gear wheels 10 and 11 are mounted freely to rotate around a transmission shaft 12 supported in suitable bearings 13—13 in the casing halves 1 and 2 at right angles to shaft 7. By means of clutches preferably of the internal expansion type, the motion of wheels 10 and 11, respectively, may be transmitted to the shaft 12.

The clutches consist of brake bands 14 and 14$^a$ lying against the inside of surfaces of flanges 16 and 15, respectively, provided on gear wheels 10 and 11. The brake bands are split as shown at 17 and 17$^a$ and may be expanded to frictionally engage the gear wheel flanges. The expanding of the brake bands is effected by arms 18 and 18$^a$ held within rectangular recesses in the brake-bands. The brake-bands are fastened to hub-caps 19 and 19$^a$ keyed to the shaft 12 by means of keys 20 and 20$^a$. Extensions of the hub-caps 19 and 19$^a$ carry loosely mounted thereon grooved collars 21 and 21$^a$ which may be longitudinally displaced thereon. Cam like projections 22 and 22$^a$ of collars 21 and 21$^a$ may ride over screws 23 and 23$^a$ provided in angular branches of the arms 18 and 18$^a$ whereby the arms will be tilted for the purpose of expanding the brake-bands.

The horizontal displacement of the collars is controlled by a rod 30 which, as viewed in Fig. 5, may be moved upward or downward, (towards or away from the operator). The movement of rod 30 is transmitted to a lever 31, one end of which is pivotally secured to rod 30 at 32. The other end of lever 31 is pinned to a shaft 33, and the lower end of this shaft is secured in a hub 34ª of a centrally pivoted triangular piece 34, the rocking of which is in turn transmitted to connecting links 35 and 36 pivoted to 34 at 37 and 38. The connecting links 35 and 36 are connected with the respective clutches by arms 39 and 40 pivotally connected with 35 and 36 at 41 and 42, and carrying at their free ends of yokes 24 and 25 engaging the grooves of collars 21 and 21ª. The arms 39 and 40 are integral with the sleeves 46 and 45 slidably mounted on a shaft 26 supported in the upper half 2 of the casing.

The rotation of shaft 12 is transmitted by a pinion gear 43 keyed thereto, to a gear wheel 50 free to rotate on the extended bushings 77 and 78 secured in the hubs 52—52 of the lower half or sump 1 of the casing by the set screws 3.

The differential consists of the usual intermeshing of bevel gears, two of which, 54 and 54ª are freely mounted between brackets connecting the gear wheel 50 with one of its hubs, and the second pair, 53 and 55 are keyed on the shafts 51—51, said shafts being free to rotate in the bore of the bushings 77 and 78.

Substantial circular plates 60 and 61 are eccentrically pivoted on the outward extending ends of bushings 77 and 78, and are held horizontally by the casing and the pinion gears 56 and 57 on the shafts 51—51. Tractor wheels 62 and 63 together with bull gears 64 and 65 secured thereto, are supported in the centre of the circular plates in suitable bearings 66 and 67. Opposite the pivots formed by the bushings 77 and 78, each plate 60, 61 has a notched projection 68, 69. The notches of projections 68 and 69 are engaged by the ball shaped ends of a lever 70 rotatably mounted on the casing 2 at the point where shaft 7 projects therethrough.

The forked end of an upwardly projecting arm 71 integral with the lever 70 is engaged by flanges 72 of a screw-block 73 cooperating with a screw 74. The screw 74 is rotatably mounted on the upper half 2 of the casing in bearing brackets 75 and 76. The downward extending position of the screwblock 73 fitting in the forked end of the arm 71 prevents the rotation of screw-block with the screw 74 whereby, in response to the rotation of screw 74 the block 73 will travel horizontally. The screw 74 may be rotated by means of a sprocket wheel 80 mounted thereon and controlled by a chain 81. The chain 81 is driven by a sprocket wheel 82 mounted on shaft 142.

The plough 100 is connected to the rear of the tractor through a suitably shaped beam 101, the free end of which terminates in a clevis 102. The clevis 102 is connected by means of a pin 104 to the free ends of a cradle formed by a yoke 106 and two arms 105. The cradle is pivoted between two arms 103 by means of pins 99 upon which the cradle is rocked. An upwardly projecting lever 107 of one of the arms 105 has its free end connected with one end of a lever 108 by pivot 109. The other end of lever 108 is pivoted to the lower part of a plough control lever 110. The lever 110 is rotatable around a pivot 111, and with its projection 112 may actuate connecting links 113 vertically to displace a frame 116. A shaft 114 is slidably mounted in a bearing 122 of frame 116 on which the plough is supported. By means of a spring pressed pawl 119 cooperating with a rack 118 of frame 116, the lever 110 may be maintained in any desired position. The pawl 119 is actuated under the control of a handle 120 pivoted on the lever near its grip end. A ring 121 serves to hold the handle 120 when it is desired permanently to remove pawl 119 from engagement with the rack.

A rod 130 may be fastened at one end to control lever 110 by means of a clamp 167. The other end of this rod is pivoted to a screw block 131 mounted on and cooperating with a screw 132 rotatably mounted on upper half of the casing 2 within a frame 139. The top surface of the screw block 131 engages the upper bar of frame 139 and thereby prevents the rotation of the block with the screw. Stops 135 and 136 provided on a horizontally movable rod 134 may be actuated by finger 133, on the screw block 131, and the displacement of the rod 134 is in turn limited by the stops engaging the bearing blocks 140 and 141 of the frame 139, the rod 134 being slidably mounted in these bearing blocks.

The screw 132 may be rotated by means of a bevelled gear 137 mounted thereon and cooperating with a bevelled gear 138 in which shaft 142 journaled in housing 143 of the upper half 2 of the casing terminates. The shaft 142 carries two friction wheels 144 and 145 each having a substantially V shaped groove around its periphery. Between wheels 144 and 145, a collar 146 is loosely mounted on shaft 142, and projecting from this collar are three spirally arranged levers, 147, 148 and 149. Discs 150 and 151 are rotatably mounted on the free ends of levers 147 and 148, respectively. The periphery of these discs has an inverted V shape registering with the grooves in wheels 144 and 145 and also with V shaped grooves around the gear wheels 10 and 11 of the transmission. The discs 150 and 151 are normally out of engagement with the groove wheels but when actuated, will transmit the motion of gear wheels 10 or 11 to the wheels 144 or 145 and thus to the shaft 142. One end of a rod 152 is secured to the lever 149, and the other end to guide rod 134. The free end of lever 149 has pivoted thereto a rod 153.

The operator guides the tractor by means of the handle bars 160 and 161 fastened to the rear of the tractor and held together by a brace 162. Two levers 163 and 164 are pivoted to the brace 162 at 165 and 166, and pivoted to these levers, respectively, are the free ends of rods 30 and 153. Pivoted to bars 160 and 161 are the combination locks and stops 155 and 158 each arranged to engage the bevelled portion like 156, (Fig. 7) provided on levers 164 and 163. The construction of 155 and 156 makes it possible for the rod 30 and 153 to be drawn towards the operator only when the locks and stops are in the position indicated in full lines in Fig. 8, and pushed away from the operator only when the locks and stops are in the position indicated in dotted lines and when the locks and stops are in the position shown in Fig. 7 the rods 30 and 153 cannot be moved.

Attention is called to the manner in which the various parts of the tractor and plough are distributed to insure proper balancing. The tractor wheels are mounted in substantial alinement with the centre line of the tractor. In the front-half are mounted the motor, crank-shaft, fly-wheels and wheel lift control, and in the rear half the transmission, differential and plough lift control.

The required vertical displacement of the tractor wheels is accomplished by the simultaneous lowering of one and the raising of the other wheel whereby the controlling mechanism may be confined within lesser space than would be required if the wheels were independently lifted and lowered.

With a similar object in view, the bell-crank connection for controlling the clutches are arranged to provide a common clutch operating mechanism adapted successively to actuate the clutches. Due to this arrangement, the lateral space required for shifting the clutches is reduced to a medium.

*Operation.*—The motor 4 is started in the well-known manner and causes the shaft 7 to revolve. The rotation of the shaft 7 is transmitted to gear wheels 10 and 11 through the agency of the gear 9, wheel 11 rotating in a clockwise and wheel 10 in a counter clockwise direction.

If the operator desires to drive in a forward direction, he will tilt the combination lock and stop 155 into the position illustrated in dotted lines in Fig. 8 and then grasp the handle 157 and push it forward. This rotates the lever 164 in a counter clockwise direction, whereby the rod 30 is pushed away from the operator. The bar 30 pushes the lever 31 with it, and the latter in turn rotates the triangular piece 34 in a counter clockwise direction. Looking at the structure as shown in Fig. 5, the connecting link 35 is moved downward and the connecting link 36 upward. The movement of connecting link 36 is transmitted through arm 40 and yoke 25 to the collar 21, causing the cam shaped projection 22 to move outward and away from the screw 23. On the other hand, the arm 39, and yoke 24 are pulled to the right and the latter forces the collar 21ª to engage with its cam shaped projection 22ª, the screw 23ª. The arm 18ª is tilted to spread the brake-band 14ª apart and into frictional engagement with the flange 15 of gear 10. The band 14ª, hub 19ª and shaft 12 will therefore be rotated with the gear 10 in a counter clockwise direction.

The pinion 43 transmits this motion to gear 50, and the latter together with differential shaft 51 and the gears 56 and 57 carried at the ends thereof are rotated in a clockwise direction. The gears 56 and 57 drive the gears 64 and 65 and the attached tractor wheels 62 and 63 in a counter clockwise direction, whereby the tractor is moved forward.

If the operator desires to move the tractor backward, he must rotate the lever 164, in the opposite direction, which, due to the engagement of bevelled portion 156 on the lever 164 by the lock and stop 155, cannot be done until the lock and stop 155 is moved into the position shown in full lines in Fig. 8. Through the bell-crank connection 30 and 31, the shaft 33 and triangular piece 34 are rotated in a direction opposite to the one in the previous case when the bar 30 was pushed away from the operator. While the triangular piece 34 is moving into its normal position as shown in Fig. 5, the connecting link 35 and arm 39 will push the collar 21ª away from gear 10, but the downward movement of lever 36 will move the collar 21 toward gear 11 into the position shown in the drawing which is the neutral position.

When the collar 21ª disengages the screw 23ª, due to the resiliency of the brake-band 14ª, the arm 18ª is righted. The frictional engagement between 14ª and 15 ceases, and the movement of gear 10 is no more transmitted to shaft 12.

During the further rotation of 34, the above described operations are repeated. However, in the present case, the collar 21ª is moved outward and the collar 21 is moved towards gear 11. Through the associated clutch mechanism, the clockwise rotation of the gear 11 is transmitted to shaft 12, and through the transmission shaft to the tractor wheels to cause the backward movement of the tractor.

*Wheel lifting.*—If it is desired to raise the wheel 62 and lower wheel 63, the operator pulls toward him the lever 163 by means of handle 159, after having thrown the combination lock and stop 158 into the position shown in full lines, for 155, in Fig. 8. The bar 163 pulls the rod 153 toward the operator and the latter rotates the lever 149 in a manner to move friction disc 150 between gear 10 and wheel 144, and the disc 151 away from gear 11 and wheel 145. The rotation of gear 10 is, therefore, transmitted through disc 150 to wheel 144 and the latter rotates the shaft 142, and the sprocket 82, and bevelled gear 138 carried thereby in a counter clockwise direction.

Through the chain 81, and sprocket wheel 80, the sprocket wheel 82 causes the counter clockwise rotation of the screw threaded shaft 74. The rotation of screw 74 causes the block 73 to travel toward the left, in Fig. 3. By means of the arm 71, the block 73 rotates the lever 70 in a counter clockwise direction, whereby the plates 60 and 61 are caused to rotate in opposite direction around the pivots.

The tractor wheels being centrally mounted on plates 60 and 61, wheel 62 will be raised and wheel 63 will be lowered from its normal position.

The opposite effect is attained if the bar 153 is pushed away from the operator. The friction disc 151 will now transmit the rotation of gear 11 to wheel 145. The sprocket 82 and gear 138 are now rotated in a direction opposite to the one resulting from the actuation of disc 150. This results in the driving of the block 73 by the screw 74 toward the right, in Fig. 3. The lever 70 rotates the plates 60 and 61 in a manner to lower wheel 62 and raise wheel 61.

The movement of the block 73 is confined within the predetermined limits by automatically operating means that prevent the operator from continuing to force the block forward or backward after it reached its predetermined final position.

Due to the rotation of the shaft 142, the bevelled gear 138 may be made to rotate in a clockwise or counter clockwise direction. The motion of gear 138 is transmitted through gear 137 to the screw threaded shaft 132. For this reason, simultaneously with the movement of block 73 the block 131 is caused to travel between stops 135 and 136. When the block 73 is nearing the limit of its movement, the finger 133 on the block 131 will have moved the stop 136 into engagement with 141. The bar 134 is displaced from right to left (Fig. 6) and moves arm 152 to rock the lever 149 backward (Fig. 4). This removes the friction disc 150 from between gear 10 and wheel 144, and the power transmission to screw 74 ceases. At the same time, the lever 149 pulls the rod 153 and lever 163 away from the operator until lever 163 is stopped by the combination lock and stop 158. When the guide rod 134 is moved in a right-hand direction due to the stop 135 being forced against 140 (this will occur when block 73 is in its extreme right-hand position) the arm 152 causes the rocking of lever 149 in the opposite direction. In this case, the disc 151 will be moved from its actuated into its normal position, and the rod 153 and lever 163 pushed towards the operator until arrested by the combination and stop 158.

*Plough lowering and raising.*—If the operator desires to lower the plough manually, he must first disengage the rod 130 from the clamp 167, and grasping the handle of lever 110 and the handle 120, he rotates lever 110 in a counter clockwise direction around its pivot 111, the pawl 119 being all the time held out of engagement with the rack 118. The lever 110 pushes the rod 108 forward and through the agency of the bell-crank connection formed by 108 and 107, the cradle 105—106 is rotated around pins 99 in a counter clockwise direction. This motion is transmitted to the plough 100 through the clevis 102 and beam 101 with the result that the nose of the plough will be lowered.

At the same time, the arm 112 due to the pressure exerted upon the connecting link 113, presses the bearing 122 downward or away from the handle bars 160 and 161, with the result that, the frame 116 is moved downward and carries the heel of the plough with it.

The plough 100 may be raised by rotating the lever 110 in the opposite direction.

If it is desired to raise or lower the plough under the control of the motive power of the tractor, the ring 121 is placed over the handle 120 permanently retracting the pawl 119. The lever 110 is now free to rotate forward or backward. Furthermore, the rod 130 is secured to the lever 110 by means of the clamp 167.

The other end of rod 130 is attached to the block 131 whereby the traveling of this block is translated into a forward or backward rotation of the lever 110 with the above described results.

What I claim is:

1. In combination, a tractor having a motor shaft and two wheels, means for connecting said wheels with said shaft to cause their rotation in a forward or backward direction, a three armed lever, a screw, a block mounted thereon and engaging one arm of said lever, connections between the other two arms of said lever and said wheels, another screw, a block, said block mounted on said other screw, an agricultural implement attached to said tractor, a lever for raising and lowering said implement connected to the last mentioned block, and driving means including a common connection interposed between said shaft and screws.

2. In combination, a tractor having two wheels, an agricultural implement, connected with said tractor, mechanism including a first friction wheel means for simultaneously lowering one and raising the other wheel and raising said implement and a second friction wheel means for simultaneously raising said one and lowering said other wheel and lowering said implement.

3. In combination, a tractor having two wheels, driving means therefor including forward and backward driving elements, an agricultural implement attached to said tractor, mechanism actuated by the forward driving element for raising a wheel and said implement, mechanism actuated by the backward driving means for lowering said wheel and implement, means operable at will for controlling said mechanisms, and automatic means for controlling said mechanisms.

4. In combination, a tractor having two wheels, driving means therefor, including forward and backward driving elements, an agricultural implement attached to said tractor, mechanism actuated by the forward driving element for raising a wheel and said implement, mechanism actuated by the backward driving element for lowering said wheel and implement, stops for limiting the raising and lowering operations, means operable at will for controlling said mechanisms and automatic means operated by said stops for controlling said mechanisms.

5. In a tractor having a motor driven transmission shaft, and two wheels driven thereby, an agricultural implement attached to said tractor, two oppositely rotating gear wheels on said shaft, V shaped grooves around the peripheries of said wheels, a second shaft, a bevelled gear, a sprocket wheel and two friction wheels secured thereto, a freely rotating collar, mounted on said second shaft, V shaped grooves around the peripheries of each of said friction wheels, three spirally displaced levers, projecting from said collar, a freely rotating friction disc having an inverted V shaped rim carried by each one of two of said levers, two screw threaded shafts, having cooperating screw blocks, means controlled by said sprocket wheel for rotating one and means controlled by the bevelled gear for rotating the other screw threaded shaft, means responsive to the travelling of one of said screw blocks in one direction for raising one and lowering the other of said first mentioned wheels, means responsive to the travelling of the other of said screw blocks in one direction for raising said implement, said forementioned means being responsive to movement of the said screw blocks in the opposite direction for reversing the above mentioned operations, means operable at will for rotating said collar by means of its third lever in one direction to move one disc to engage with its rim the grooves of a friction and gear wheel and in the opposite direction for moving the other disc to engage with its rim the grooves of the other friction and gear wheel, movable stops for limiting the displacement of one of said screw blocks and a lever controlling said third lever actuated by said stops.

6. In a tractor having a casing, a motor shaft with one end mounted in the forward part of the casing, a bevelled gear carried by the other end of said shaft, two bevelled gears cooperating with said gear, a second shaft mounted back of the centre line of said casing at right angles to said motor shaft and carrying said two bevelled gears, an agricultural implement, a pivoted connection between said implement and the rear end of said casing, a lever for manually raising and lowering said implement, and means including gears through which said lever is operatively connected with said second shaft.

7. In combination, a motor driven two-wheeled tractor, means including a gear wheel for coupling a wheel to said motor, an agricultural implement mounted on a beam, a connection between said tractor and beam, a manually rotatable lever, means responsive to said lever for simultaneously raising the end of said beam connected with the tractor and said implement, mechanism in said tractor for vertically displacing one of its wheels with respect to the other, means for coupling said mechanism with said gear wheel, and means for connecting said mechanism with said lever.

8. In combination, a tractor having a plurality of wheels, an agricultural implement attached thereto, a driving mechanism, a second mechanism actuated by said driving mechanism for vertically displacing said wheels in opposite directions separate mechanism for vertically displacing said implement and an operative connection between said last mentioned mechanism and a portion of said second mechanism.

9. In a motor driven tractor comprising a plurality of wheels, an agricultural implement attached thereto, mechanism for vertically displacing a wheel, separate mechanism including a screw and block for vertically displacing said implement and means including a common operating shaft for interconnecting said mechanisms with the tractor driving motor.

10. In a motor driven tractor, driving wheels therefor, an agricultural implement attached to said tractor a pair of gear wheels driven by the tractor motor, a shaft, two friction wheels attached to said shaft, two friction discs, two screw threaded shafts having cooperating screw blocks, means actuated by said shaft for rotating said screw threaded shafts, means responsive to the traveling of one of said screw blocks in one direction for raising one and lowering the other driving wheel and means responsive to the travelling of the other of said screw blocks in one direction for raising said implement said forementioned means being responsive to the traveling of said screw blocks in the opposite direction for reversing the operations, means operable at will for moving said discs to interconnect said gear wheels and friction wheels, and means operated responsive to vertical movement to a predetermined point.

11. In a motor propelled vehicle, a shaft, means for connecting and disconnecting said shaft with the motor for rotation in either direction, wheels movable vertically with relation to the frame, means operated by rotation of the shaft in one direction for moving said wheels vertically in opposite directions and means operated by the rotation of said shaft for moving said implement vertically.

12. In combination, a motor driven tractor having oppositely revolving transmission gears and a pair of drive wheels, means for operatively interconnecting said drive wheels with either of said gears, an agricultural implement attached to said tractor, a shaft two friction wheels attached to said shaft, a collar freely rotatable on said shaft, two angularly displaced levers projecting from said collar, a freely rotating friction disc carried by each one of said levers, two screw threaded shafts having cooperating screw blocks, means actuated by said shaft for rotating said screw threaded shafts, means responsive to travelling of one of said screw blocks in one direction for raising one and lowering the other of said drive wheels and means responsive to travelling of the other of said screw blocks in one direction for raising said implement, said forementioned means being responsive to travelling of the said screw blocks in the opposite directions for reversing the above mentioned operations, means controllable at will for rocking said collar to interpose one or the other friction disc between a gear wheel and a friction wheel, movable stops for limiting the movement of one of said screw blocks and automatic means controlled by said stops for rocking said collar.

In testimony whereof, I WILLIAM F. SMITH, have signed my name to this specification this 6th day of December, 1921.

WILLIAM F. SMITH.